US006959399B2

United States Patent
King et al.

(10) Patent No.: US 6,959,399 B2
(45) Date of Patent: Oct. 25, 2005

(54) SELECTIVE AUTOMATED POWER CYCLING OF FAULTY DISK IN INTELLIGENT DISK ARRAY ENCLOSURE FOR ERROR RECOVERY

(75) Inventors: Allen King, San Jose, CA (US); Davis Qi-Yu Chu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 09/961,950

(22) Filed: Sep. 24, 2001

(65) Prior Publication Data

US 2003/0093721 A1 May 15, 2003

(51) Int. Cl.[7] .............................................. G06F 11/00
(52) U.S. Cl. ........................... 714/6; 714/23; 713/324
(58) Field of Search ........................ 714/6, 7, 23, 42, 714/36; 711/114; 713/324, 330

(56) References Cited

U.S. PATENT DOCUMENTS

| 5,278,838 | A | 1/1994 | Ng et al. .................... 371/10.1 |
| 5,371,882 | A | 12/1994 | Ludlam ...................... 395/575 |
| 5,379,162 | A | 1/1995 | Cunningham et al. ........ 360/53 |
| 5,701,406 | A | 12/1997 | Matsumoto et al. ... 395/182.04 |
| 5,832,199 | A | 11/1998 | Apperley et al. ...... 395/182.04 |
| 5,832,204 | A | 11/1998 | Apperley et al. ...... 395/183.18 |
| 5,848,229 | A | 12/1998 | Morita ................... 395/182.05 |
| 5,913,927 | A | 6/1999 | Nagaraj et al. ................ 714/8 |
| 5,915,081 | A | 6/1999 | Yamamoto et al. .... 395/182.04 |
| 6,079,029 | A | 6/2000 | Iwatani et al. ................. 714/6 |
| RE36,846 | E | 8/2000 | Ng et al. ........................ 714/6 |
| 6,192,481 | B1 | * 2/2001 | Deenadhayalan et al. ... 713/324 |
| 6,408,343 | B1 | * 6/2002 | Erickson et al. ............. 710/15 |
| 2002/0038436 | A1 | * 3/2002 | Suzuki .......................... 714/6 |
| 2002/0042893 | A1 | * 4/2002 | Larson et al. .................. 714/7 |
| 2002/0053010 | A1 | * 5/2002 | Piccirillo et al. ........... 711/170 |

OTHER PUBLICATIONS

IBM Technical Disclosure Bulletin; D.R. Martin and M.J. McDermott; vol. 40 No. 03 mar. 1997; pp. 247–250.
IBM Research Disclosure; Dec. 1999; "Shortcut Error Recovery Procedure".

* cited by examiner

Primary Examiner—Scott Baderman
(74) Attorney, Agent, or Firm—Walter W. Duft (57) ABSTRACT

A disk array storage system and error recovery method wherein recovery from disk errors is achieved using automated selective power cycling. Initially, identification is made of a faulty disk drive in the array that exhibits an error condition in which the drive fails to perform a requested operation. The faulty disk drive is selectively power cycled while power to other disk drives in the array is maintained. Following the power cycling sequence, the requested operation is retried.

43 Claims, 6 Drawing Sheets

| SCSI CMD (SEP CMD) | COMMAND DESCRIPTOR BLOCK | DATA TRANSFERRED | NOTE ON DATA |
|---|---|---|---|
| INQUIRY | 12 00 00 00 60 00 | 03 00 02 02 33 01 00 ... 53 41 46 2D 54 45 ... (SAF-TE IN ASCII) | A PROCESSOR DEVICE SUPPORTS 'POWER ON/OFF DISK IN SLOT' FEATURE (BYTE 5, BIT 0 = 1) |
| READ BUFFER (READ DEVICE SLOT STATUS) | 3C 01 04 00 00 00 00 00 40 00  BYTE 2 = 04h (BUFFER ID FOR READ STATUS) | 01 00 00 00 <u>05</u>  SLOT 0 BYTE 3 = 05h | 01 00 00 00 <u>05</u>  SLOT 1 BYTE 3 = 05h | BOTH SLOT 0 AND SLOT 1 HAVE DISK INSERTED (BYTE 3, BIT 0 = 1) AND THE SLOTS ARE ACTIVATED (BYTE 3, BIT 2 = 1) |
| WRITE BUFFER (PERFORM SLOT OPERATION) | 3B 01 00 00 00 00 00 00 41 00 | 12 01 <u>06</u> 00 ... 00 00 (65 BYTES)  BYTE 1 = 01h AND BYTE 2 = 06h | SEP INSTRUCTED TO POWER OFF DISK IN SLOT 1 AND FLASH ASSOCIATED LED |
| READ BUFFER (READ DEVICE SLOT STATUS) | 3C 01 04 00 00 00 00 00 40 00  BYTE 3 = 04h (BUFFER ID FOR READ STATUS) | 01 00 00 00 <u>05</u>  SLOT 0 BYTE 3 = 05h | 01 00 00 00 <u>02</u>  SLOT 1 BYTE 3 = 02h | SLOT 1 STATUS SHOWS NO DISK INSERTED (BYTE 3, BIT 0 = 0). HOST ADAPTER VALIDATES SLOT 1 STATUS |
| WRITE BUFFER (PERFORM SLOT OPERATION) | 3B 01 00 00 00 00 00 00 41 00 | 12 01 <u>01</u> 00 ... 00 00 (65 BYTES)  BYTE 1 = 01h AND BYTE 2 = 01h | SEP INSTRUCTED TO POWER ON DISK IN SLOT 1 AND TO STOP FLASHING ASSOCIATED LED |
| READ BUFFER (READ DEVICE SLOT STATUS) | 3C 01 04 00 00 00 00 00 40 00  BYTE 3 = 04h (BUFFER ID FOR READ STATUS) | 01 00 00 00 <u>05</u>  SLOT 0 BYTE 3 = 05h (0101b) | 01 00 00 00 <u>05</u>  SLOT 1 BYTE 3 = 05h (0101b) | SLOT 1 STATUS SHOWS DISK INSERTED (BYTE 3, BIT 0 = 1). HOST ADAPTER VALIDATES SLOT 1 STATUS |

SELECTIVE AUTOMATED POWER CYCLING OF FAULTY DISK IN INTELLIGENT DISK ARRAY ENCLOSURE FOR ERROR RECOVERY

BACKGROUND OF THE INVENTION

1. Field of the Invention

The present invention relates to disk array storage systems, and particularly RAID systems. More particularly, the invention concerns error recovery in disk array storage systems in response to disk error conditions.

2. Description of the Prior Art

Disk array storage systems store data across multiple disk storage devices (disk drives) arranged to form one or more disk drive array groups. A common type of disk array storage system is the RAID (Redundant Array of Independent Disks) system. In such apparatus, a host computer connects to a RAID controller that manages one or more RAID intelligent disk enclosures, each containing a control processor and an array of disk drives mounted in individual device slots.

A disk error condition will result from a failure of one of the RAID disks to respond to the RAID controller's attempts to implement some action, such as a disk selection operation, or a command transfer or data/control transfer operation. Usually, there is an indication of a persistent error despite command or phase retries. A disk error condition may likewise manifest itself as a failure to continue an operation that has started.

The conventional approach to correcting a disk error condition in a RAID system is to issue a device or bus reset command if no response is received to a disk command within a pre-defined time limit, or after multiple command retries have failed. Following the reset attempt, the failed command is reissued. If the command again fails, the reset recovery action may be retried one or more times up to some specified retry limit. At that point, if there is still no response, the RAID controller marks the drive as "dead," which means the drive is placed in offline status with further accesses being prohibited.

If a disk drive marked dead is a member of a redundant RAID array, the higher level logical drive associated with the faulty physical drive is still accessible. However, array performance is degraded due to the need to reconstruct data for the faulty drive when requested by the host. If the faulty drive is part of a non-redundant RAID array, the associated logical drive must be marked offline, making data access impossible.

Disk drive manufacturers receiving drives for repair that have been marked dead in a RAID system often find them quite operable. This condition is known as NTF (No Trouble Found). The drive manufacturers often complain to their customers about the mis-killings by RAID controllers. The RAID controller manufacturers, on the other hand, may defend their actions by referring to certain posted user-accessible events that indicate reasons for killing the disk drives.

What the RAID controllers actually failed to do in these disputed cases is to try to power cycle the disk drive and then retry the failing operation before killing the drive. On the other hand, disk drive manufacturers invariably try to power up the returned dead disk drive before diagnosing the problem. Certain transient or non-recurring disk drive ASIC errors, including a possible microprocessor hang, can be cleared if the unit is first powered off and then powered back on, causing the drive firmware to be reloaded from the media and the hardware to be restarted from scratch.

In a conventional RAID system enclosure, power cycling a single faulty disk drive may mean powering down the entire multi-disk drive enclosure and powering it back on. Alternatively, the faulty drive may need to be manually removed from its device slot and then be re-inserted into the slot, thereby simulating a disk drive power cycle. Neither of these manual actions is practical. The former action is particularly undesirable insofar as it involves taking multiple disk drives down at the same time. The latter action requires operator retraining insofar as RAID system operators are trained only to remove disk drives for the purpose of substituting in a new disk drive.

It is possible to retrain RAID system operators to manually remove a faulty disk drive and then re-insert it into the device slot. This action would simulate a disk drive power cycle and presumably clear the disk error condition. Then, in the case of a redundant RAID array housed in an intelligent enclosure, an auto rebuild operation would take place if no standby rebuild has already occurred. Alternatively, the re-inserted disk drive would become a new standby drive for a future rebuild. In the case of a non-redundant array in a RAID enclosure, a user-initiated data restoration would have to take place before the associated logical drive can be placed back in operation.

Although the foregoing manual action may correct the disk error condition, there are a number of associated problems. First, human operator intervention is required. Second, it is not practical to assume that the human operator is located where the problem is at the time a disk error condition arises. Third, and perhaps most importantly, the faulty disk drive is first marked "dead" before the operator intervention occurs. This means in a redundant RAID system that a data regeneration operation has already taken place, and that a physical rebuild operation must be implemented following the human intervention. In a non-redundant RAID system, logical drive operation will have already been terminated and a user-required data restore may have taken place.

Accordingly, a need exists for a disk array storage system in which disk error conditions can be resolved in a manner that avoids the foregoing disadvantages. What is particularly required is a disk error recovery procedure wherein a faulty disk drive can be tested for transient or non-recurring software, firmware or hardware errors that normal resets will not resolve. Preferably, such error recovery will be preformed prior to the faulty disk drive being marked as dead and taken offline.

SUMMARY OF THE INVENTION

The foregoing problems are solved and an advance in the art is obtained by a disk array storage system and error recovery method wherein recovery from disk errors is achieved using selective automated power cycling. Initially, identification is made of a faulty disk drive in the array that exhibits an error condition in which the drive fails to perform a requested operation. The faulty disk drive is then selectively power cycled while power to other disk drives in the array is maintained. Following the power cycling sequence, the requested operation is retried.

The power cycling sequence is preferably implemented as an extended part of a conventional error recovery procedure. Instead of marking the faulty disk drive "dead" after the requested operation fails, the power cycling sequence of the invention is attempted one or more times. Only when the faulty disk drive fails to respond to automated power cycling will the disk drive be marked "dead" and taken offline.

The power cycling sequence includes a cycle of removing and then restoring power at a power input to the disk drive. For enclosures that provide more than one power input to the disk drives, the power cycling sequence may include removing and then restoring power to one of the power inputs to the disk drive. In that case, the drive spins down and then spins up, and the drive firmware is reloaded in the meantime.

The power cycling sequence is preferably implemented in part by a disk drive host adapter and in part by an intelligent disk enclosure processor device that, among other things, controls power supplied to the disk drive. In such environments, the power cycling sequence may include the host adapter querying the processor to determine whether the processor supports the power cycling sequence. The power cycling sequence may further include the host adapter querying the processor to determine the status of the faulty disk drive prior to issuing a power cycling command to the processor. The host adapter can then issue a disk drive power off command to the processor followed by a disk drive power on command. After each of the power off and power on commands, the host adapter may query the processor to determine that the disk drive is in a proper state.

In a preferred implementation of the invention, the host adapter is a RAID controller and the processor is a SEP device within a SAF-TE enclosure. In a SAF-TE based RAID system, the foregoing queries and commands may be implemented using a modified SAF-TE INQUIRY command, a SAF-TE READ BUFFER command configured to implement a SEP Read Device Slot Status command, and a SAF-TE WRITE BUFFER command configured to implement a modified SEP Perform Slot Operation command containing a disk drive power on Flag, a disk drive power off Flag, and an Identify Flag for providing an indication that the disk drive is in a power off state.

The power cycling sequence of the invention may be repeated a number of times during a single power cycling session before killing the faulty disk drive and taking it offline. To prevent unlimited sequence looping, however, a power cycle retry threshold may be used. A power cycle retry count is then maintained and compared against the threshold during each power cycling sequence. A cumulative power cycle threshold may also be used to identify disk drives that repeatedly require selective automated power cycling to be invoked during storage system operations.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
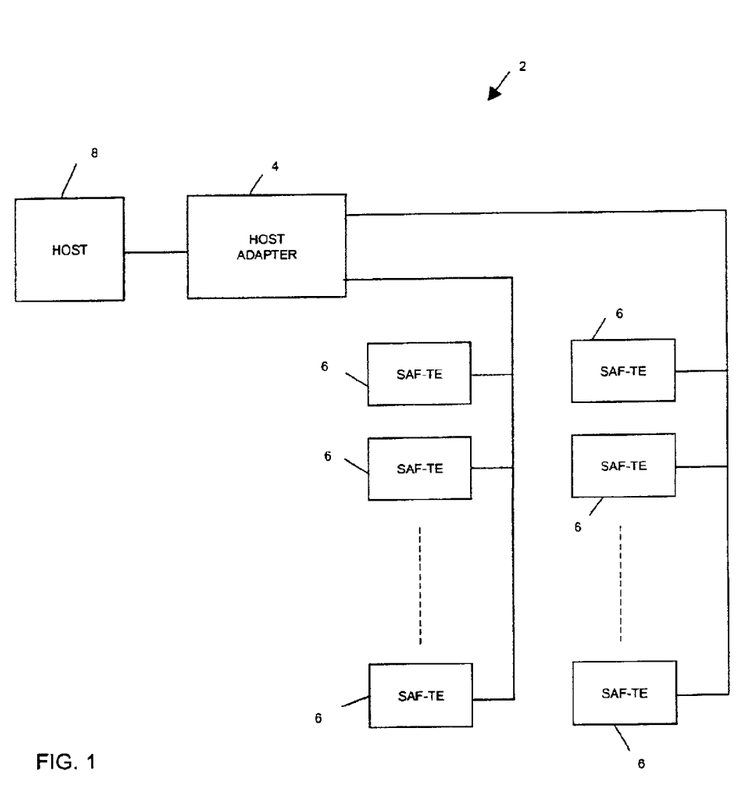
FIG. 1 is a functional block diagram showing a RAID system connected to a host.

Turning now to the figures, wherein like reference numerals represent like elements in all of the several views, FIG. 1 illustrates a RAID system 2 that is adapted to perform selective automated power cycling in accordance with the invention. The RAID system 2 includes a host adapter 4 and a plurality of intelligent disk enclosures 6. Although not shown in FIG. 1, the host adapter 4 is implemented as a conventional RAID controller containing the usual processing resources, program and data storage memory resources, and SCSI communication resources. However, modifications need to be made to the programming of the host adapter 4 to perform selective automated power cycling in accordance with the invention. These modifications are described in more detail below.

Although not shown in FIG. 1, each disk enclosure 6 conventionally houses an array of hard disk drives and an enclosure processor device. Each disk drive is mechanically mounted in a device slot within the enclosure 6 and receives electrical power, cooling, and an interface connection that allows the disk drive to communicate with a host computer 8, via the host adapter 4. As in the case of the host adapter 4, the enclosure processor device is generally conventional in nature. However, modifications need to be made to its stored program to perform selective automated power cycling in accordance with the invention. In addition, hardware needs to be added to selectively power-down and power-up each device slot. These modifications are described in more detail below.

By way of example only, and not by way of limitation, the enclosures 6 can be implemented so as to generally meet the SCSI Accessed Fault-Tolerant Enclosure (SAF-TE) Interface Specification revision 1.00 (Oct. 17, 1995) and the SAF-TE Addendum updated on Jul. 11, 1996. The objective of the SAF-TE Interface Specification is to provide a standard, non-proprietary way for disk and RAID controllers from different vendors to be automatically integrated with peripheral packaging that supports a defined set of status signals, hot swapping of hard disk drives, and monitoring of enclosure components. A SAF-TE implemented disk enclosure implements the SAF-TE Interface Specification on an ANSI SCSI-2 compliant enclosure processor device operating as a SCSI target. This is known as a SEP (SAFT-TE Processor) device. The SEP device commonly supports six SCSI commands: WRITE BUFFER, READ BUFFER, INQUIRY, TEST UNIT READY, SEND DIAGNOSTIC AND REQUEST SENSE. As described in more detail below, a subset of these commands may be used with minor modification to implement selective automated power cycling in accordance with the invention.

Figure 2:
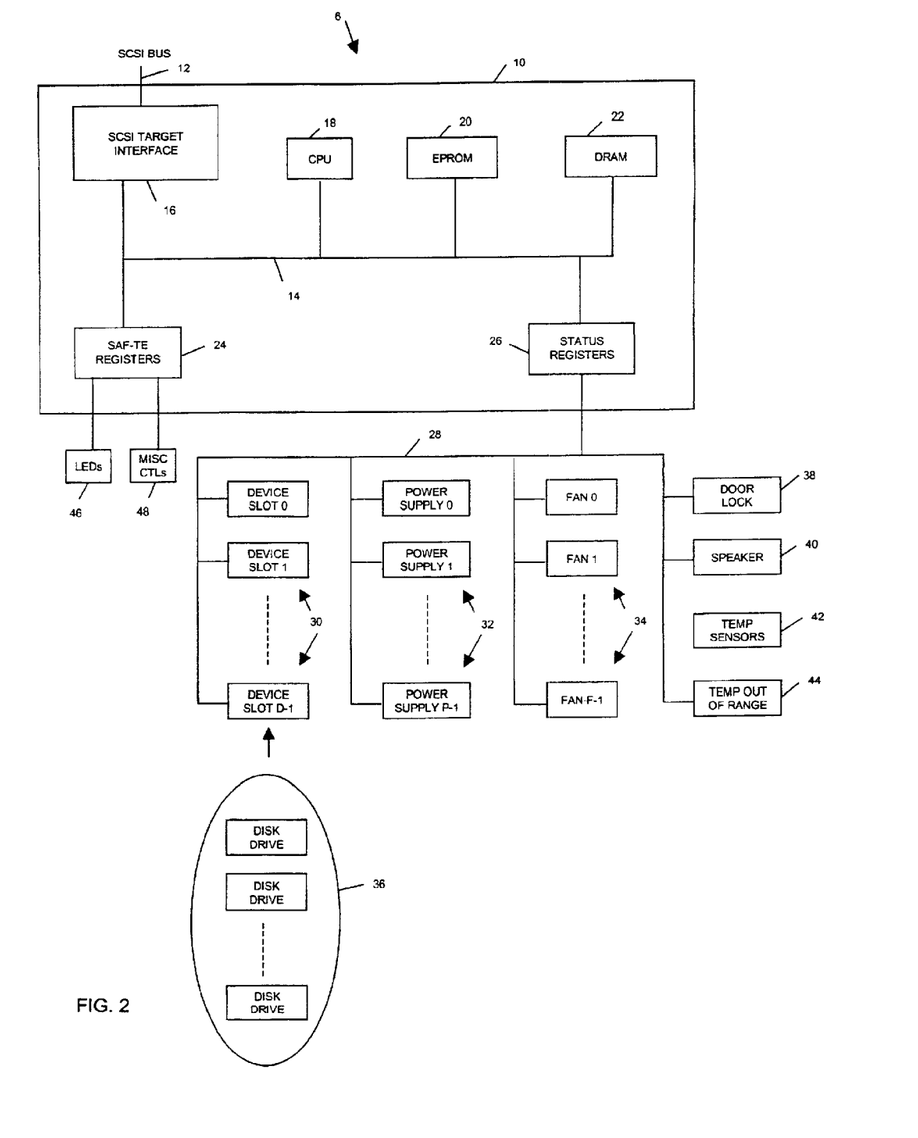
FIGS. 2 and 2A are functional block diagrams showing details of the FIG. 1 RAID system.

Turning now to FIG. 2, a SAF-TE implemented version of the enclosure 6 is shown. In this SAF-TE configuration, the enclosure 6 includes a SEP device 10 that connects via a SCSI bus 12 to a RAID controller (not shown), such as the host adapter 4 of FIG. 1. The SEP device 10 comprises a SEP bus system 14 that interconnects a SCSI target interface 16, a CPU 18, an EEPROM 20, a DRAM 22, a bank of SAF-TE registers 24, and a bank of status registers 26. Except to the extent of the programming modifications required to implement the invention, and the hardware modifications of FIG. 2A (described below) the foregoing components are all conventional in nature and further details of their construction and operation will be omitted from the present discussion.

It will be seen that the status registers 26 are connected to a disk drive status and control bus system 28. The function of the status and control bus system 28 is to pass status and control information between the status registers 26, on one hand, and a bank of device slots 30, a bank of power supplies 32 and a bank of fans 34, on the other hand. Each device slot 30 is designed to receive one of a plurality of disk drives 36. Each device slot 30 is also associated with the bank of power supplies 32 and the bank of cooling fans 34.

Additional components of the enclosure 6 are used to provide status information, audible alarms, and other conventional SAF-TE enclosure functions. These include a door lock 38, a speaker 40, temperature sensors 42, and a temperature out of range indicator 44, all of which are connected to the status and control bus 28. In addition, there are a plurality of LEDs 46 and miscellaneous controls 48 that communicate with the SAF-TE registers 24.

Figure 2A:
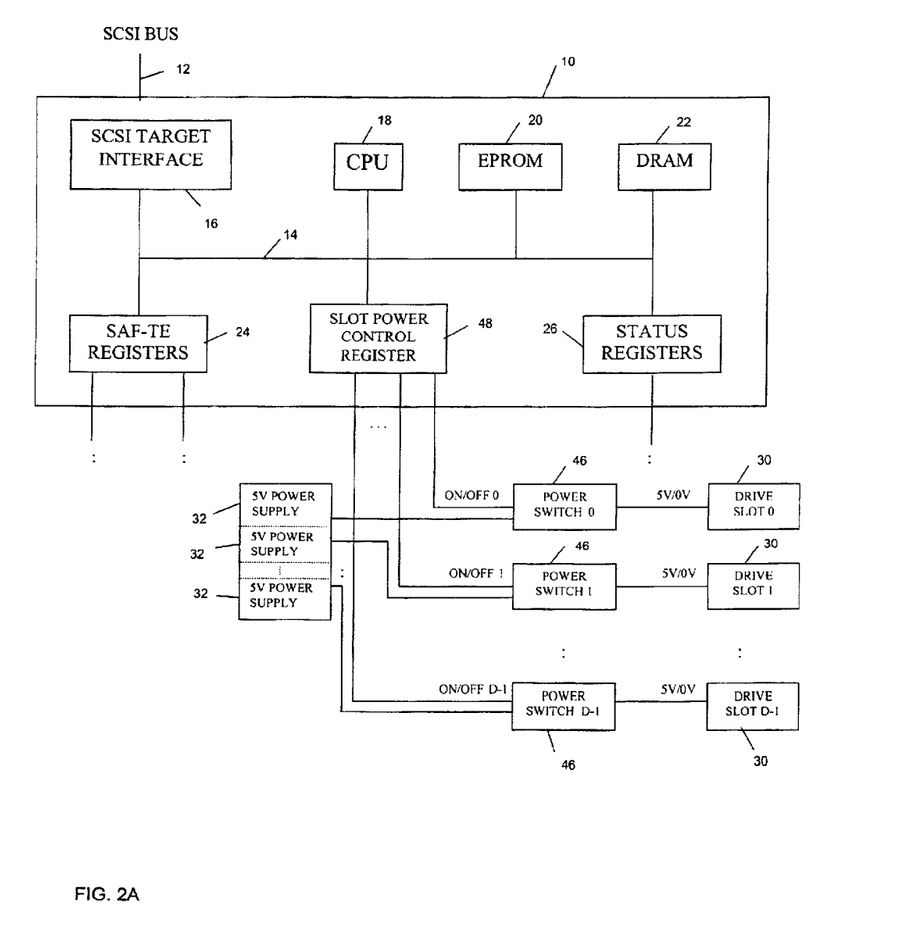

FIG. 2A shows exemplary hardware modifications that can be made to a conventional SAF-TE enclosure in order to implement the invention. In particular, the bank of power supplies 32 can be associated with a bank of power switches 46 that selectively deliver power supply voltage to the device slots 30. The power switches 46 can be controlled by a slot power control register 48 that may be added as part of the device hardware of the SEP 10.

Having described an exemplary configuration of a SAF-TE implemented configuration of the enclosure 6, a procedure for implementing selective automated power cycling will now be described in the context of SAF-TE/SEP commands and data packets. As persons skilled in the art of RAID system design and implementation will appreciate, there are two principal types of SAF-TE/SEP commands that a RAID controller may use to request specific actions of a SEP device in a SAF-TE enclosure. First, there are commands that request some action to be performed in the enclosure, such as indicating a drive failure and requesting the SEP device to take certain action. Such commands are sent to the SEP device with a WRITE BUFFER operation. Second, there are commands that request information from the SEP device, such as the status of device slots. Such commands are sent to the SEP device using a READ BUFFER command. A third command type that can be used with any SCSI target, known as the INQUIRY command, is used by the RAID controller to ascertain parameter information about a particular SAF-TE enclosure.

To implement the present invention in a SAF-TE RAID environment, the SCSI commands INQUIRY, WRITE BUFFER and READ BUFFER (as defined for SAF-TE) may be used, together with several SEP commands that are derivatives of the WRITE BUFFER and READ BUFFER commands. These SEP commands are known as "Perform Slot Operation," "Write Device Slot Status" and "Read Device Slot Status." By making relatively minor modifications to some of these commands and their data packets, selective automated power cycling can be implemented. However, before describing the specific command and data packet modifications that can be used to implement the features of the invention, a brief review will now be presented of the foregoing SAF-TE/SEP commands in their conventional form.

INQUIRY Command

The INQUIRY command starts with a command descriptor block sent by a SCSI initiator, such as a RAID controller, to a SCSI target, such as a SEP device. There then follows a command data phase (DATA IN) in which the SCSI target sends a data packet containing various parameter information requested by the initiator. The structure of a conventional INQUIRY command descriptor block (CDB) is illustrated in Table 1:

TABLE 1

INQUIRY CDB

| Bit  | 7 | 6 | 5 | 4 | 3 | 2 | 1 | 0 |
|------|---|---|---|---|---|---|---|---|
| Byte |   |   |   |   |   |   |   |   |
| 0    | Operation Code (12h) ||||||||
| 1    | Logical Unit Number | | | Reserved | | | | 0 |
| 2    | 00h ||||||||
| 3    | Reserved ||||||||
| 4    | Allocation Length ||||||||
| 5    | 00h ||||||||

The various fields of the INQUIRY command descriptor block are defined as follows:

Logical Unit Number—Specifies which SCSI logical unit (0 through 7) of the selected SCSI ID is the target of this command. If the LUN (Logical Unit Number) specified in this field is not supported, then the response data will indicate such in the description of the Peripheral Qualifier and Peripheral Device Type in the response data format (see below).

Allocation Length—Specifies the number of bytes that the initiator has allocated for the response data. The target transfers the number of bytes specified up to the maximum available. An allocation length of 00h indicates that no data will be transferred. This condition is not considered an error, and a status of "GOOD" should be returned without entering the data phase of the INQUIRY command. If more bytes are requested than are available for transfer, the target will return only the available number of bytes.

The format of a conventional response data packet sent from the SCSI target to the SCSI initiator during the data phase of the INQUIRY command is illustrated in Table 2:

TABLE 2

INQUIRY Data Format

| Bit | 7 | 6 | 5 | 4 | 3 | 2 | 1 | 0 |
|-----|---|---|---|---|---|---|---|---|
| Byte |   |   |   |   |   |   |   |   |
| 0 | Peripheral Qualifier ||| Peripheral Device Type |||||
| 1 | 00h ||||||||
| 2 | 0 | 0 | 0 | 0 | 0 | ANSI-Approved Version (02h) |||
| 3 | 0 | 0 | 0 | 0 | Response Data Format (02h) ||||
| 4 | Additional Length ||||||||
| 5 | Reserved (00h) ||||||||
| 6 | Reserved (00h) ||||||||
| 7 | 00h ||||||||
| 8 15 | Vendor Identification ||||||||
| 16 31 | Product Identification ||||||||
| 32 35 | Firmware Revision Level ||||||||
| 36 43 | Enclosure Unique Identifier ||||||||
| 44 49 | SAF-TE Interface Identification String ||||||||
| 50 53 | SAF-TE Specification Revision Level ||||||||
| 54 95 | Vendor Unique Parameters ||||||||

The various fields of the INQUIRY response data packet are defined as follows:

Peripheral Qualifier—Indicates whether the selected LUN is a valid SCSI device. This field will be 000b if a supported LUN is selected, and 01 1b if an unsupported LUN is selected. A value of 000b indicates that the device specified in the Peripheral Device Type is currently connected to this LUN. It does not imply that the specified logical device is ready for access by the initiator. A value of 01 1b indicates that the target is not capable of supporting a device on this logical unit.

Peripheral Device Type—Indicates the type of SCSI device at the selected LUN. If a valid LUN is selected, this field will be 03h (SCSI Processor Device), if an invalid LUN is selected this field will be 1Fh (no device type).

ANSI-Approved Version—This field is 02h to indicate compliance with the ANSI SCSI-2 specification.

Response Data Format—This field is 02h to indicate that the format of the INQUIRY response data is as defined in the ANSI SCSI-2 specification.

Additional Length—This field indicates the number of bytes of additional INQUIRY command parameters available for transfer, beginning with Byte 05h. This value is not adjusted if the Allocation Length in the CDB is too large or too small to accommodate the entire response.

Vendor Identification—This 8 byte ASCII string identifies the product vendor.

Product Identification—This 16 byte ASCII string specifies the product ID.

Firmware Revision Level—This 4 byte ASCII string identifies the current firmware revision of the target SEP device.

Enclosure Identifier—This field holds a 58 bit identification number. The number should be unique for each individual unit produced by a particular enclosure manufacturer. This makes it possible to positively distinguish between two or more RAID enclosures connected to the same host system. The combination of this field, along with the Vendor Identification and Product Identification fields, will uniquely identify any peripheral unit from any manufacturer.

SAF-TE Interface Identification String—This 6 byte field holds the constant ASCII string "SAF-TE". This serves to identify that the enclosure is compliant with the SAF-TE Interface Specification.

SAF-TE Specification Revision Level—This 4 byte field holds an ASCII string of the format x.xx which identifies the revision of the SAF-TE Interface Specification to which this device claims compliance. ASCII string data is stored with the most significant (leftmost) character stored at the lowest byte offset of the field. Bytes 54 to 95 are for optionally implemented vendor unique information.

WRITE BUFFER Command

The WRITE BUFFER command starts with a command descriptor block sent by a SCSI initiator, such as a RAID controller, to a SCSI target, such as a SEP device. There then follows a command data phase (DATA OUT) in which the SCSI initiator sends a data packet containing data associated with the command to the SCSI target. The structure of a conventional WRITE BUFFER command descriptor block (CDB) is illustrated in Table 3.

TABLE 3

WRITE BUFFER CDB

| Bit<br>Byte | 7 | 6 | 5 | 4 | 3 | 2 | 1 | 0 |
|---|---|---|---|---|---|---|---|---|
| 0 | | | | Operation Code (3Bh) | | | | |
| 1 | | Logical Unit Number | | Reserved | | | Mode (01h) | |
| 2 | | | | 00h | | | | |
| 3 | | | | 00h | | | | |
| 4 | | | | 00h | | | | |
| 5 | | | | 00h | | | | |
| 6 | | | | 00h | | | | |
| 7 | | | | Transfer Length (MSB) | | | | |
| 8 | | | | Transfer Length (LSB) | | | | |
| 9 | | | | 00h | | | | |

The WRITE BUFFER command descriptor block, when formatted with a mode value of 01h (001b), is used by a RAID controller to send a WRITE-type command data packet to a SEP device. The functionality and format of each WRITE BUFFER data packet is individually described.

Mode—This 3-bit field should hold (001b) to indicate that the data packet to be sent to the target during the data phase of this command is in the SAF-TE command format.

Transfer Length—The transfer length, in bytes, of the data packet to be sent to the target during the data phase of this command. An allocation length of 0 is not considered an error; the target will return status of "GOOD" without entering a data phase.

Perform Slot Operation Command

This SEP command is derived from the data packet that follows the WRITE BUFFER command descriptor block in the data phase of the WRITE BUFFER command. The Perform Slot Operation command is used to perform various operations on device slots, such as to prepare a device slot for the insertion or removal of a hard drive. Although this advance notice may not be required by all hardware implementations, this is a mandatory command to avoid having a CHECK CONDITION status returned. In those implementations that do not have to electrically or mechanically prepare the drive slot for drive insertion or removal, this command should be treated by the target as a "NO OPERATION" condition with GOOD status returned.

Table 4 illustrates the format of the data packet sent from the SCSI initiator to the SCSI target during the data phase of a mode 01h WRITE BUFFER command configured as a Perform Slot Operation Command. The data is 64 bytes long if no vendor specific fields are used.

TABLE 4

Perform Slot Operation (12h)

| Bit<br>Byte | 7 | 6 | 5 | 4 | 3 | 2 | 1 | 0 |
|---|---|---|---|---|---|---|---|---|
| 0 | | | | Operation Code (12h) | | | | |
| 1 | | | | Slot Number | | | | |
| 2 | | | | Operation Flags | | | | |
| 3<br>63 | | | | Reserved | | | | |
| 64 | | | | Vendor Specific | | | | |

The various fields of the Perform Slot Operation command data packet are defined as follows:

Operation Code—12h is the opcode for the Perform Slot Operation command.

Slot Number—This field indicates which drive slot to prepare for performing the given operation.

Operation Flags—This field is a set of 8 flags that indicate the operations to be performed on this slot. There may be only one flag set at any time. If more than one flag is set, the target will return a "CHECK CONDITION" status with sense data indicating an "INVALID SEP COMMAND IN WRITE BUFFER DATA PACKET" error condition.

The operation flags for the Perform Slot Operation command are conventionally defined as follows—

Bit 0—Prepare For Operation Flag—This flag indicates that the target should take any action required to make the device in this slot available on the SCSI bus.

Bit 1—Prepare For Insertion Or Removal Flag—This bit indicates that the target should take any action required to allow the safe physical insertion or removal of a device from this slot.

Bit 2—Identify Flag—This flag indicates that the target should indicate the physical location of this slot in some manner, to indicate to the system operator which slot is being addressed. This is usually done by flashing an adjacent LED in a unique pattern.

Bits 3–7—Reserved.

Bytes 3 through 63 of the Perform Slot Operation command are reserved and should be zero.

Write Device Slot Status Command

The Write Device Slot Status command is also derived from the data packet that follows the WRITE BUFFER command descriptor block during the data phase of that command. It is a mandatory command for the SEP device and the host adapter (RAID controller). The command is used to inform the target of the state of each of its associated slots and the devices potentially inserted. This information is used to drive the enclosure status signals (LEDS, LCD, audible alarm, etc.) to some meaningful state, depending on the vendor's implementation.

The length of the Write Device Slot Status command data packet depends on the number of device slots (d) on the SCSI channel. The number of device slots on a particular channel may be determined with a conventional READ ENCLOSURE CONFIGURATION command (not described herein). There are three bytes of data for each drive slot on the channel.

Table 5 illustrates the format of the data packet sent from the SCSI initiator to the SCSI target to implement the Write Device Slot Status Command during the data phase of the WRITE BUFFER operation.

TABLE 5

Write Device Slot Status (10h)

| Bit<br>Byte | 7 | 6 | 5 | 4 | 3 | 2 | 1 | 0 |
|---|---|---|---|---|---|---|---|---|
| 0 | | | | Operation Code (10h) | | | | |
| 1 | | | | Slot 0 Byte 0 | | | | |
| 2 | | | | Slot 0 Byte 1 | | | | |
| 3 | | | | Slot 0 Byte 2 | | | | |
| 3d−2 | | | | Slot d−1 Byte 0 | | | | |
| 3d−1 | | | | Slot d−1 Byte 1 | | | | |
| 3d | | | | Slot d−1 Byte 2 | | | | |
| 3d+1 | | | | Vendor Specific | | | | |

READ BUFFER Command

The READ BUFFER command starts with a command descriptor block sent by a SCSI initiator, such as a RAID controller, to a SCSI target, such as a SEP device. There then follows a command data phase (DATA IN) in which the SCSI target sends a data packet containing enclosure status information requested by the SCSI initiator. The conventional READ BUFFER command descriptor block (CDB) has the structure illustrated in Table 6:

TABLE 6

READ BUFFER CDB

| Bit<br>Byte | 7 | 6 | 5 | 4 | 3 | 2 | 1 | 0 |
|---|---|---|---|---|---|---|---|---|
| 0 | | | | Operation Code (3Ch) | | | | |
| 1 | Logical Unit Number | | | Reserved | | | Mode (01h) | |
| 2 | | | | Buffer ID | | | | |
| 3 | | | | 00h | | | | |
| 6 | | | | | | | | |
| 7 | | | | Transfer Length (MSB) | | | | |
| 8 | | | | Transfer Length (LSB) | | | | |
| 9 | | | | 00h | | | | |

The various fields of the READ BUFFER command descriptor block are defined as follows:

Mode—This 3-bit field should hold (001b) to indicate that the data packet to be transferred to the initiator during the data phase of this command is in the SAF-TE command format.

Buffer ID—This byte determines the content and form of the data packet to be transferred to the initiator during the data phase of this command.

Transfer Length—The transfer length, in bytes, of the data packet to be transferred to the initiator during the data phase of this command. A transfer length of 0 is not considered an error; the target will return a status of "GOOD" without entering a data phase. If a transfer length is sent which is greater than the available data length for a particular Buffer ID on the target, then only the available number of bytes will be transferred and no error condition will be indicated.

Read Device Slot Status Command

The Read Device Slot Status command returns information on the current state of each drive/slot. There are 4 bytes returned for each device slot contained in the enclosure. To send this command, the Buffer ID field of the READ BUFFER CDB is set to 04h. Table 7 illustrates the data packet returned during the data phase of the READ BUFFER command:

TABLE 7

Read Device Slot Status (04h)

| Bit<br>Byte | 7 | 6 | 5 | 4 | 3 | 2 | 1 | 0 |
|---|---|---|---|---|---|---|---|---|
| 0 | | | | Slot 0 Byte 0 | | | | |
| 1 | | | | Slot 0 Byte 1 | | | | |
| 2 | | | | Slot 0 Byte 2 | | | | |
| 3 | | | | Slot 0 Byte 3 | | | | |
| | | | | Slot d−1 Byte 0 | | | | |
| | | | | Slot d−1 Byte 1 | | | | |
| | | | | Slot d−1 Byte 2 | | | | |
| | | | | Slot d−1 Byte 3 | | | | |

Each group of four bytes is a set of bit flags. The first three bytes returned are a copy of the three bytes of flags most recently sent by the initiator for the respective drive/slot using the Write Device Slot Status command. The bit definitions are identical to those used with that command.

The fourth byte contains flags that indicate other conditions of interest on the drive slot. Flag bytes are defined with Bit 0 being the least significant bit (00000001) and Bit 7 the most significant bit (10000000). The bit fields are defined as follows (Bit 0 is the least significant bit).

Byte 3

Bit 0—Device Inserted Flag—Indicates whether or not there is a physical device inserted in this slot. This does not imply that the device is ready for access on the SCSI bus. A bit value of 0 means no device is inserted; a bit value of 1 means a device is inserted.

Bit 1—Ready for Insertion/Removal Flag—This flag indicates whether or not the slot is ready for the physical insertion or removal of a device. A bit value of 0 means not ready; a bit value of 1 means ready.

Bit 2—Prepared For Operation Flag—This flag indicates whether or not the slot is activated so that the inserted drive may be accessed on the SCSI bus. A bit value of 0 means not activated; a bit value of 1 means activated.

Bits 3–7—Reserved.

Exemplary Implementation of Invention Using Modified SEP Commands

The automated power cycling procedure of the invention can be implemented in a SEP command environment by making relatively minor modifications to the INQUIRY and WRITE BUFFER/Perform Slot Operation commands. Depending on the particular host adapter (RAID controller) and SEP device involved, implementing these modifications will require changes to either the software, firmware or hardware systems thereof, or some combination of software, firmware and hardware. In any case, the required changes will be relatively straightforward when guided by the discussion of exemplary command modifications hereinafter set forth.

Modification of the INQUIRY Command

The INQUIRY command can be modified by adding a flag bit to the INQUIRY command's response data string, such as Bit 0 of Byte 5, to indicate the support status of the SEP device for a new feature which shall be referred to herein as "power on/off disk in slot." Setting this bit to "1" can be used to indicate that the SEP device implements the feature. Conversely, setting this bit to "0" can be used to indicate that the SEP device does not implement the feature. Note that as indicated in Table 2, Byte 5 was reserved and as such is set to 00h for an enclosure that does not support the automated power cycling feature. If the feature is supported, Byte 5 will be set to 01h.

Modification of the WRITE BUFFER/Perform Slot Operation Command

Although the Perform Slot Operation command was originally intended for use by a host adapter to prepare a device slot for the insertion or removal of a hard disk drive, experience has shown that SAF-TE implementations do not require the use of this command for such preparations. In reality, a disk drive being inserted in the slot causes the slot to be powered up by the enclosure automatically, and a disk drive being removed from the slot causes the slot power to be automatically removed by the enclosure. Consequently, the SEP device treats this command as "NO OPERATION" when it is received, and a status of "GOOD" is returned.

For purposes of the present invention, the Perform Slot Operation command can be modified to operate in a new way with the disk drive being already inserted in the slot. More particularly, the Operation Flags of Byte 2 of Table 4 can be redefined as follows:

Bit 0—Power On Disk Drive in the Slot Flag—The SEP device will power up the disk drive in the designated slot. This bit is also preferably readable by use of the Read Device Slot Status command. In particular, of the four bytes returned by the SEP device (see Table 7), Bit 0 of Byte 3 will be set to "1", indicating device inserted.

Bit 1—Power Off Disk Drive in the Slot Flag—The SEP device will power off the disk drive in the designated slot. This bit is also preferably readable by use of the Read Device Slot Status command. In particular, of the four bytes returned by the SEP device (Table 7), Bit 0 of Byte 3 will be set to "0", indicating no device inserted.

Bit 2—Identify Flag as defined above by the SAF-TE Interface Specification—Now used in conjunction with Bit 1 being set to "1" to provide an operator indication that a disk drive in a slot has been powered off. Once the disk drive in the slot is powered on, the Identify Flag is cleared.

It will be appreciated that Bits 0 and 1 above are mutually exclusive. Bits 3–7 of the modified Perform Slot Operation command remain Reserved as in the unmodified command. Bytes 3 through 63 of the modified Perform Slot Operation command also remain reserved and are set to zero. The Vendor Specific fields of the modified Perform Slot Operation command need not be implemented.

Power Cycling Command Sequence Example

Figure 3:
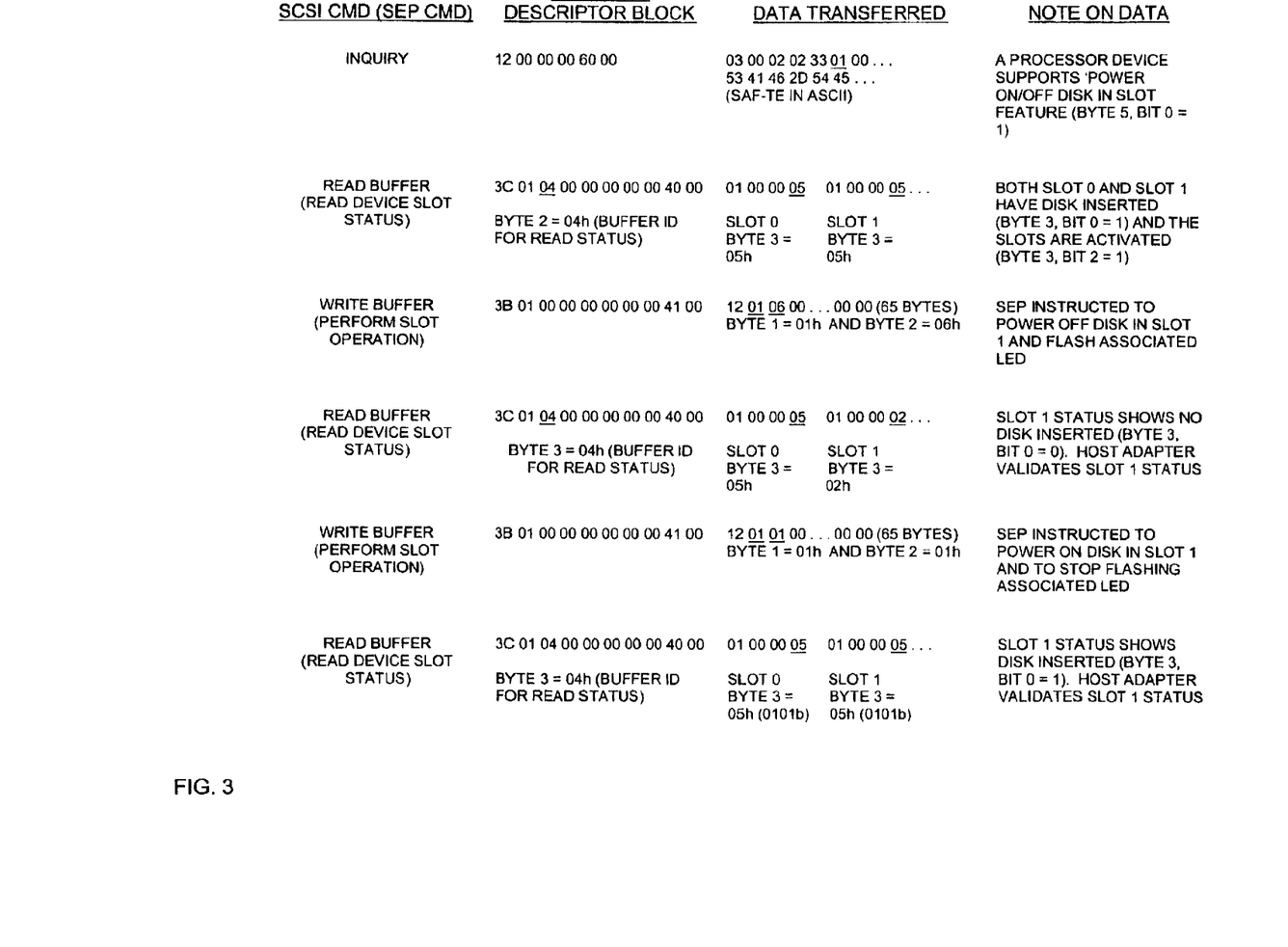
FIG. 3 is a table showing an exemplary sequence of commands that may be used to implement selective automated power cycling in accordance with the invention.

Turning now to FIG. 3, an example of the basic commands that may be used to power cycle a faulty disk drive in a disk drive slot of a SAF-TE enclosure will now be described. Note that all numbers in FIG. 3 are shown in hexadecimal format unless otherwise indicated. All bytes are increasingly numbered from left to right, beginning with Byte 0 on the left of each byte string. Each row of FIG. 3 represents a command issued by a host adapter to a SEP device in the SAF-TE enclosure. Commands are issued in top-to-bottom order beginning with the first row of FIG. 3. As for the columns of FIG. 3, beginning at the left hand side, the first column identifies the command being issued, the second column shows the byte values of the command descriptor block, the third command shows the data packet bytes transferred during the data phase of the command, and the fourth column describes the effect of the command. The example assumes that the disk drive to be power cycled is inserted in "slot 1" of the SAF-TE enclosure.

As in the case of the above-discussed command modifications, implementation of the power cycling command sequence will require changes to either the software, firmware or hardware systems thereof, or some combination of software, firmware and hardware, depending on the particular RAID controller and SEP device involved. In any case, however, the required changes will be relatively straightforward when guided by the discussion of exemplary command sequence hereinafter set forth.

Although a basic power cycling sequence could be implemented with just two commands—a power off command, followed by a power on command—it is good programming practice to use additional commands to determine the capabilities of the SEP device before issuing a sequence of power off and power on commands, and to confirm that each power off and power on command completes successfully.

Accordingly, the host adapter first preferably checks to determine whether the SEP device in the SAF-TE enclosure of interest supports the "power on/off disk in slot" feature. This is done by issuing an INQUIRY command (FIG. 3, first row, first column) with the command descriptor block (FIG. 3, first row, second column) constructed so that the opcode byte (Byte 0) is set to 12h (signifying an INQUIRY command). Assuming the SEP device supports the "power on/off disk in slot" feature, Byte 5 of the return data packet will be set to 01h (0000 0001b) (FIG. 3, first row, third column), thereby confirming this capability (FIG. 3, first row, fourth column) according to the INQUIRY command modification discussed above.

The host adapter next confirms that a disk drive is inserted in slot 1 by issuing a READ BUFFER/Read Device Slot Status command (FIG. 3, second row, first column) with the command descriptor block (FIG. 3, second row, second column) constructed so that the opcode byte (Byte 0) is set to 3Ch (signifying the READ BUFFER command per Table 6 above). Byte 1 of the command descriptor block is set to 01h so that its mode field is 001b (signifying that the data buffer will be in SAF-TE command format per Table 6 above). Byte 2 of the command descriptor block is set to 04h to specify a Buffer ID corresponding to the Read Device Slot Status command (see discussion of Table 7 above). Assuming that both device slot 0 and device slot 1 of the SAF-TE enclosure have disk drives inserted and the slots are activated, the Byte 3 of the return data for each such slot (FIG. 3, second row, third column) will be 05h (0000 0101b), thereby confirming this condition (FIG. 3, second row, fourth column) (see discussion of Table 7 above).

The host adapter now powers off the drive in slot 1 by issuing a WRITE BUFFER command (FIG. 3, third row, first column) with the WRITE BUFFER/Perform Slot Operation command descriptor block (FIG. 3, third row, second column) constructed so that the opcode byte (Byte 0) is set to 3Bh (signifying WRITE BUFFER command per Table 3 above). Byte 1 of the command descriptor block is set to 01h so that its mode field is 001b (signifying that the data buffer will be in SAF-TE command format per Table 3 above). Byte 0 of the data packet sent during the data phase of the WRITE BUFFER command descriptor block (FIG. 3, third row, third column) is set to 12h to set the opcode to Perform Slot Operation (see Table 4 above). Byte 1 of the data packet is set to 01h (0000 0001b) to select slot 1 (see Table 4 above). Byte 2 of the data packet is set to 06h (0000 0110b) to set the "Power Off Disk Drive in the Slot" Flag and the "Identify" Flag (FIG. 3, third row, fourth column) according to the Perform Slot Operation command modifications discussed above.

The host adapter next verifies that the slot 1 device has been powered off by issuing a READ BUFFER/Read Device Slot Status command (FIG. 3, fourth row, first column) with the READ BUFFER command descriptor block (FIG. 3, fourth row, second column) constructed so that the opcode byte (Byte 0) is set to 3Ch (signifying the READ BUFFER command per Table 6 above). Byte 1 of the command descriptor block is set to 01h so that its mode field is 001b (signifying that the data buffer will be in SAF-TE command format per Table 6 above). Byte 2 of the command descriptor block is set to 04h to specify a Buffer ID corresponding to the Read Device Slot Status command (see discussion of Table 7 above). Because the disk drive in slot 1 is now powered off, Byte 3 of the return data for slot 1 (FIG. 3, fourth row, third column) will be 02h (0000 0010b), thereby confirming this condition (FIG. 3, fourth row, fourth column) (see discussion of Table 7 above).

The host adapter now powers the drive in slot 1 back on by issuing a WRITE BUFFER command/Perform Slot Operation command (FIG. 3, fifth row, first column) with the WRITE BUFFER command descriptor block (FIG. 3, fifth row, second column) constructed so that the opcode byte (Byte 0) is set to 3Bh (signifying the WRITE BUFFER command per Table 3 above). Byte 1 of the command descriptor block is set to 01h so that its mode field is 001b (signifying that the data buffer will be in SAF-TE command format per Table 3 above). Byte 0 of the data packet sent during the data phase of the WRITE BUFFER command descriptor block (FIG. 3, fifth row, third column) is set to 12h to set the opcode to Perform Slot Operation (see Table 4 above). Byte 1 of the data packet is set to 01h to select slot 1 (see Table 4 above). Byte 2 of the data packet is set to 01h (0000 0001b) to set the "Power On Disk Drive in the Slot" Flag and deselect the "Identify" Flag (third row, fourth column) according to the Perform Slot Operation command modifications discussed above.

The host adapter now completes the sequence by verifying that the slot 1 device has been powered back on by issuing a READ BUFFER/Read Device Slot Status command (FIG. 3, sixth row, first column) with the READ BUFFER command descriptor block (FIG. 3, sixth row, second column) constructed so that the opcode byte (Byte 0) is set to 3Ch (signifying the READ BUFFER command per Table 6 above). Byte 1 of the command descriptor block is set to 01h so that its mode field is 001b (signifying that the data buffer will be in SAF-TE command format per Table 6 above). Byte 2 of the command descriptor block is set to 04h to specify a Buffer ID corresponding to the Read Device Slot Status command (see Table 7 above). Because the disk drive in slot 1 is now powered on, Byte 3 of the return data for slot 1 (FIG. 3, sixth row, third column) will be 05h (0000 0101b), thereby confirming this condition (FIG. 3, sixth row, fourth column) (see discussion of Table 7 above).

Extended Error Recovery Procedure with Power Cycling Command Sequence

Figure 4:
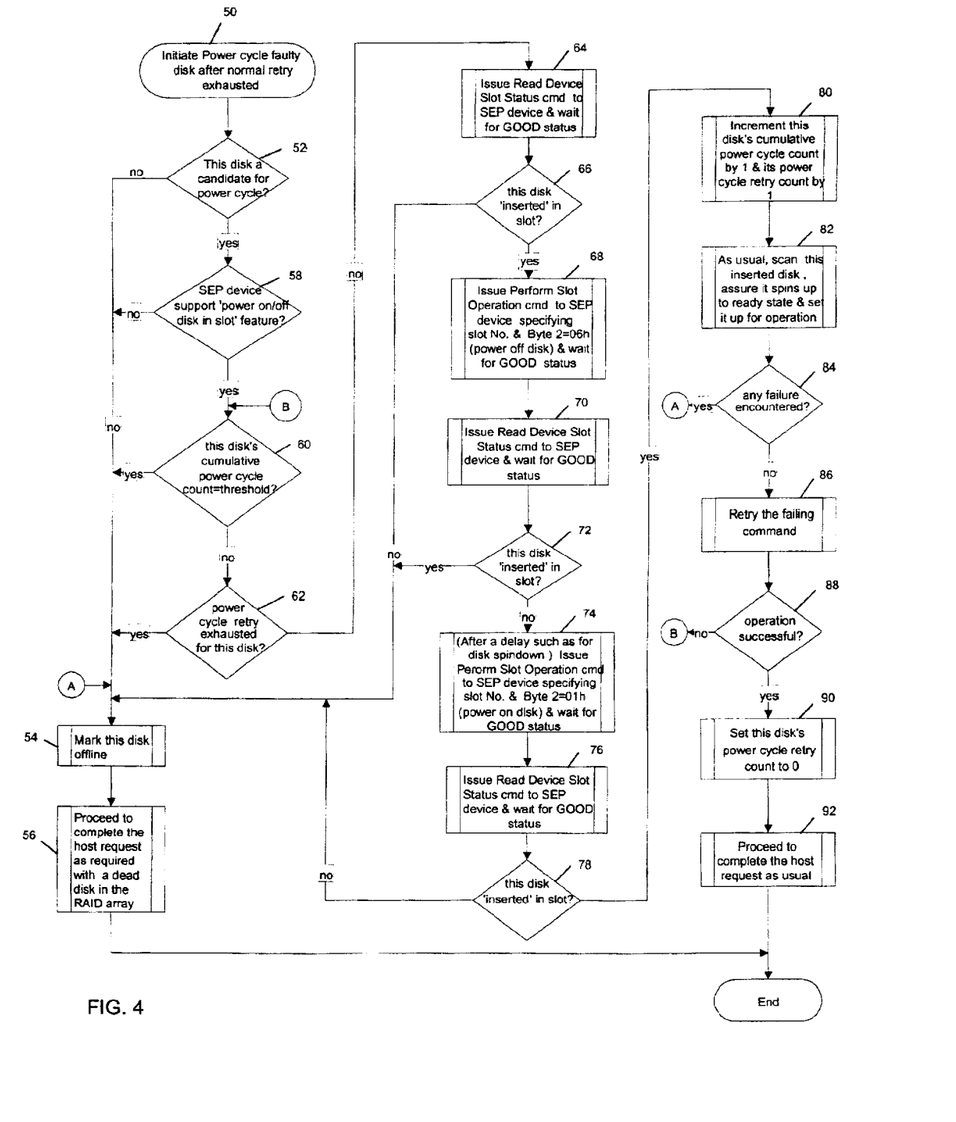
FIG. 4 is a flow diagram showing exemplary steps performed by a RAID controller to perform an error recovery procedure according to the invention.
Figure 5:
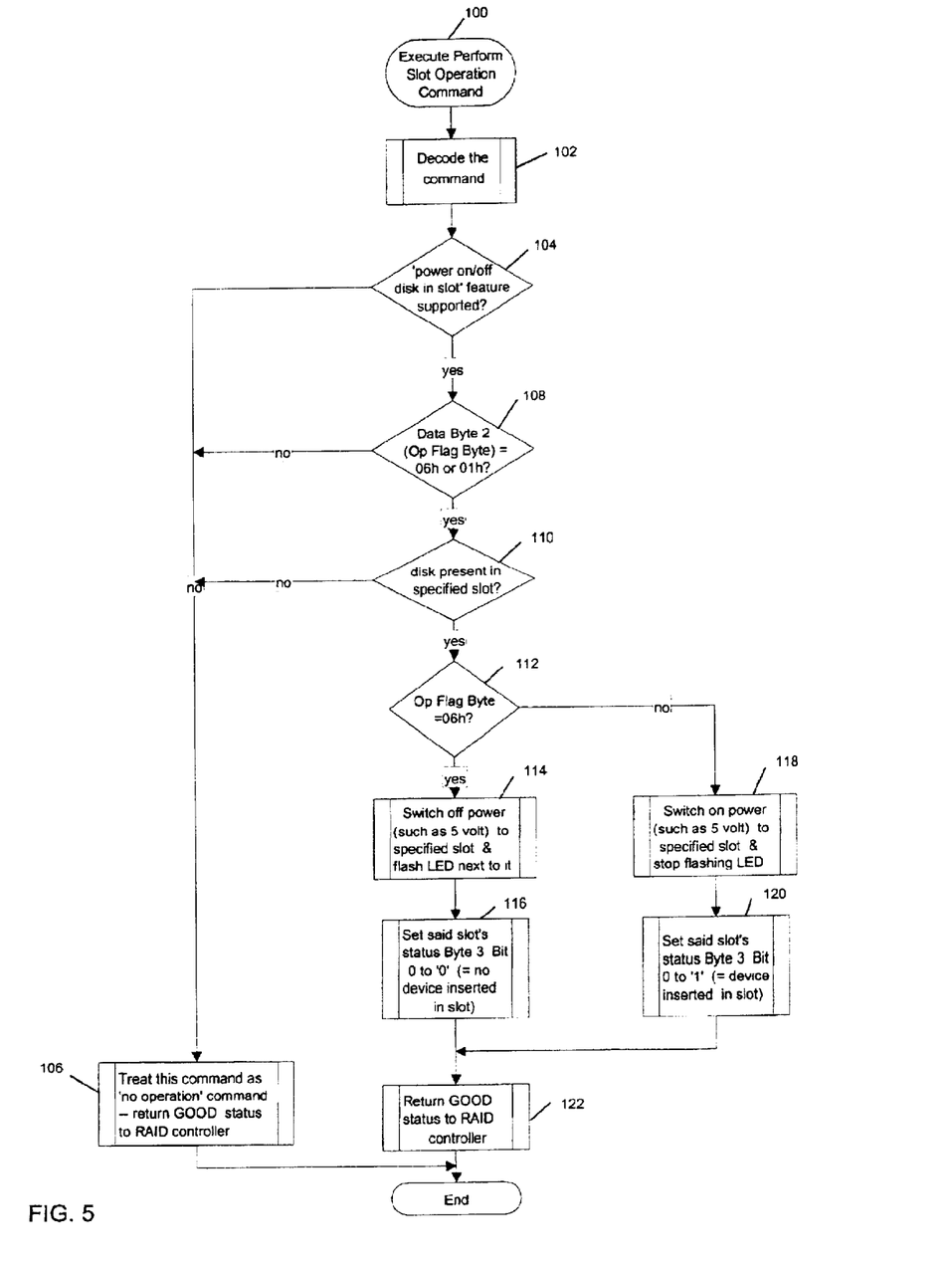
FIG. 5 is a flow diagram showing exemplary steps performed by a RAID enclosure processor to perform an error recovery procedure according to the invention.

Turning now to FIGS. 4 and 5, exemplary programmed procedures, respectively implemented by a host adapter and a SEP device in a SAF-TE enclosure, are shown for implementing an automated power cycling session as an extension of a conventional error recovery procedure. In particular, FIG. 4 shows how the host adapter can be programmed (via software, firmware, hardware or some combination thereof) to implement an automated power cycling session relative to a faulty disk drive that fails to respond to the host adapter's attempt for disk selection or information transfer (command, data, message or status), fails to continue a normal operation that was started, or exhibits a persistent hardware error. FIG. 5 shows how the SEP device in the SAF-TE enclosure can be programmed (via software, firmware, hardware or some combination thereof) to respond to commands issued by the host adapter during the power cycling session.

Step 50 in FIG. 4 represents the entry point of the host adapter's role in the automated power cycling session. Step 50 will typically be implemented after normal operation retry procedures are exhausted. In step 52, the host adapter initially determines whether the faulty disk drive is a candidate for power cycling. More often than not, the faulty disk drive is a candidate for power cycling unless there was an unusual circumstance, such as the drive running out of spare sectors on the medium for sector reassignment, or a persistent SCSI interface handshaking failure caused, for example, by a cable or connector problem. If the disk drive is not a candidate for power cycling, the procedure moves to step 54 and the disk drive is marked offline ("dead"), leading to a service action called by the operator. The host adapter will then typically proceed to complete the host request in step 56, as required with the dead disk drive in the RAID array.

If it is determined in step 52 that the disk drive is a candidate for power cycling, processing moves to step 58. In this step, the host adapter determines whether the SEP device in the SAF-TE enclosure supports the "power on/off disk in slot" feature by issuing the modified INQUIRY command discussed above and checking Byte 6, Bit 0 of the response data (or any other designated response data field). If the response data indicates that the SEP device does not support the required feature, processing jumps to step 54. If the SEP devices does have the required capability, a test is made in step 60 to determine whether a cumulative power cycle count for the disk drive (maintained by the host adapter) has exceeded a specified threshold. This test is used to identify disk drives that have a history of repeated power cycling over many power cycling sessions, thereby indicating some chronic problem condition. Such disk drives are marked offline in step 54.

If the cumulative power cycle threshold has not been exceeded, a test is made in step 62 to determine whether a power cycle retry threshold has been exceeded for the disk drive within the current power cycling session. This test is used to prevent an indefinite recurrence of disk power cycling (looping). When this count (maintained by the host adapter) reaches a predefined threshold, the host adapter marks the disk drive offline in step 54.

Assuming the disk drive passes the tests of steps 60 and 62, the power cycling session moves to step 64. Here, the host adapter issues a READ BUFFER/Read Device Slot Status command to the SEP device in the SAF-TE enclosure, and waits for a return status of "GOOD." In step 66, the return data is examined to determine that the faulty drive is inserted in the slot (Byte 3, Bit 0=1 of drive's return data) (0=no device inserted, 1=device inserted). If the drive is not inserted in the slot, the drive is taken offline in step 54. If the drive is inserted in the slot, the host adapter proceeds to step 68 and issues a WRITE BUFFER/Perform Slot Operation command with Byte 1 of the Perform Slot Operation data packet identifying the faulty drive's slot, and Byte 2 being set to 06h to set the "Power Off Disk Drive in the Slot" and "Identify" Flags to 1 and all remaining Flags to 0. After a return status of "GOOD" is received, the host adapter issues a READ BUFFER/Read Device Slot Status command in step 70 and waits for a return status of "GOOD." In step 72, the host adapter consults Byte 3, Bit 0 of the drive's return data to verify that the faulty disk drive has been powered off. If the drive is still shown as being inserted, the drive is marked offline in step 54. If the drive is shown as not being inserted, it is assumed to be in a power off state.

At this point, all the electronic circuitry on the disk drive will have been shut off, causing a disk spin down. At its convenience or right after the disk spin down is complete, the host adapter will implement step 74 by issuing a WRITE BUFFER/Perform Slot Operation command with Byte 1 of the Perform Slot Operation data packet identifying the faulty drive's slot, and Byte 2 being set to 01h to set the "Power On Disk Drive in the Slot" Flag to 1 and all remaining Flags to 0. This operation will cause the power to be restored to the slot, resulting in a power on reset of the disk drive, with all error latches reset, leading to a clean disk re-start. After a return status of "GOOD" is received, the host adapter issues a READ BUFFER/Read Device Slot Status command in step 76 and waits for a return status of "GOOD." In step 78, the host adapter consults Byte 3, Bit 0 of the drive's return data to verify that the faulty disk drive has been powered up. If the drive is shown as being not inserted, the drive should be marked offline in step 54. If the drive is shown as being inserted, it is assumed to be in a power on state.

After the disk drive is spun up after being returned to the power on state, the drive may presumably return to normal operation if the previous fault is non-recurring. First, however, the drive's cumulative power cycle count and its power cycle retry count are incremented by 1 in step 80. Using conventional processing, the host adapter then scans the faulty disk drive in step 82, assures that it spins up to ready state, and sets it up for operation. Failures encountered during this step are tested for in step 84 and the drive is marked offline in step 54 if such failures are found. The host adapter can then retry the failing operation in step 86 and test for success of the operation in step 88. If the operation is again unsuccessful, processing can return to step 60 so that another power cycling sequence is performed. As previously indicated, power cycling may be repeated for a predefined number of times if necessary up to some predefined power cycle retry threshold, and the disk drive can be marked offline if the recovery attempts are unsuccessful. On the other hand, if the retry operation is found to be successful in step 88, the disk drive's power cycle retry count is reset to 0 in step 90, and the host adapter proceeds to complete the host request as usual in step 92, marking the end of the automated power cycling session at step 94.

Importantly, while the above-described automated power cycling session is being performed, the host adapter can service requests on other disk drives without suffering significant performance degradation. In fact, this situation is similar to the recovery actions resulting from the loss of readiness of a disk drive (that is, it is spun down) in the midst of input/output operations occurring on other drives of a RAID array through the same SCSI BUS.

As indicated above, FIG. 5 illustrates the processing that takes place in a SEP device in response to commands sent to it by a host adapter during a power cycling session, namely the commands sent according to steps 68 and 74 of FIG. 4. In step 100, the SEP device initiates execution of the WRITE BUFFER/Perform Slot Operation command. This begins in step 102 with decoding the command. After decoding, the SEP device tests in step 104 whether the SAF-TE enclosure supports the "power on/off disk in slot" feature. If not, the SEP device proceeds to step 106 and treats the command as a "NO OPERATION," returning a status of "GOOD" to the host adapter. Processing of the issued command then ends.

If it is determined in step 104 that the "power on/off disk in slot" feature is supported, a determination is made in step 108 whether the Perform Slot Operation command is either a power on or power off command. This is done by checking whether Byte 2 of the command's data packet is either 01h (power on) or 06h (power off). If it is neither of these values, the process proceeds to step 106 and command processing ends. If the test in step 108 shows a value of 01h or 06h for Byte 2 of the data packet, the SEP device implements step 110 and tests whether a disk drive is present in the specified slot. If not, the process proceeds to step 106 and command processing ends.

If a disk drive is present in the specified slot, processing proceeds to step 112 and the SEP device checks whether Byte 2 of the command's data packet equals 06h, signifying a power off command. Note that the SEP device could alternatively check for a power on command condition in step 112. If a power off command condition is found in step 112, steps 114 and 116 are performed. In step 114, the SEP device switches off the power to the specified slot and flashes the LED next to it. Note that if the SEP device 10 of FIG. 2A is used to implement the steps of FIG. 5, it would call upon the slot power control register 48 to implement the power off command by switching one of the power switches 46 to an "off" state. In step 116, the SEP device sets the slot's status Byte 3, Bit 0 to "0" to signify a "no device inserted in slot" condition. If a power on command condition is found in step 112, steps 118 and 120 are performed. In step 118, the SEP device switches on the power to the specified slot and stops flashing the LED next to it. Note that if the SEP device 10 of FIG. 2A is used to implement the steps of FIG. 5, it would call upon the slot power control register 48 to implement the power on command by switching one of the power switches 46 to an "on" state. In step 120, the SEP device sets the slot's status Byte 3, Bit 0 to "1" to signify a "device inserted in slot" condition. In step 122, the SEP device returns status to the host adaptor following the completion of any of steps 106, 116 and 120.

Note that when a disk drive is inserted in a slot in a SAF-TE enclosure via a conventional Single Connector Attachment (SCA) connector, the disk drive's 5 volt and 12 volt pins are automatically connected to respective power supplies included in the SAF-TE enclosure. The 12 volt power supply is normally used to activate the drive spindle motor. The 5 volt power supply is generally used to power all electronic circuitry, including that of spin-up control.

For the SEP device to implement a powering off and powering on a disk drive in the slot, it is possible to toggle only the 5 volt supply. According to disk drive manufacturers, a disk drive's 12 volt power supply can be turned on all the time without causing damage to drive circuitry, which is designed to be 5 volt fail-safe. As the 5 volt supply is cut off, the disk drive will be spun down. After the 5 volt supply is turned back on, the disk drive will spin up either automatically if its auto spin-up feature is enabled, or will be directed to spin up by the host adapter.

Accordingly, a disk array storage system and error recovery method have been disclosed. While various embodiments of the invention have been described, it should be apparent that many variations and alternative embodiments could be implemented in accordance with the invention. For example, although a preferred embodiment of the invention is described in terms of SAF-TE commands and their data packets, the concept may be applied to other types of intelligent disk enclosures, such as those built to the SCSI-3 Enclosure Services (SES) architecture for SCSI, and fibre channel disk drives. It is understood, therefore, that the invention is not to be in any way limited except in accordance with the spirit of the appended claims and their equivalents.

What is claimed is:

1. An error recovery method for recovering from disk errors in a disk array storage system having an array of disk drives adapted to store data, the method comprising the steps of:
   identifying a faulty disk drive in said array that exhibits an error condition in which said drive fails to perform a requested operation;
   determining whether automated selective disk drive power cycling is supported;
   upon said determining producing a negative result, marking said faulty disk drive offline;
   upon said determining producing a positive result, selectively power cycling said disk drive while maintaining power to other disk drives in said array; and
   retrying said requested operation following said power cycling sequence.

2. A method in accordance with claim 1 wherein said power cycling sequence includes removing and then restoring power at a power input to said disk drive.

3. A method in accordance with claim 1 wherein said power cycling sequence includes removing and then restoring power to one of at least two power inputs to said disk drive.

4. A method in accordance with claim 1 wherein said power cycling sequence is implemented in part by a disk drive host adapter.

5. A method in accordance with claim 1 wherein said power cycling sequence is implemented in part by a processor that controls power supplied to said disk drive.

6. A method in accordance with claim 1 wherein said power cycling sequence is implemented by a disk drive host adapter and a processor that controls power supplied to said disk drive.

7. A method in accordance with claim 6 wherein said determining includes said host adapter querying said processor to determine whether said processor supports said power cycling sequence.

8. A method in accordance with claim 6 wherein said power cycling sequence includes said host adapter querying said processor to determine the status of said disk drive prior to issuing a power cycling command to said processor.

9. A method in accordance with claim 6 wherein said power cycling sequence includes said host adapter issuing a disk drive power off command to said processor followed by a disk drive power on command.

10. A method in accordance with claim 6 wherein said determining and said power cycling sequence collectively include:
   a feature support inquiry sent by said host adapter to said processor to determine whether said processor supports said power cycling sequence;
   a first disk drive status inquiry sent by said host adapter to said processor to determine the presence of said disk drive;
   a power off command sent by said host adapter to said processor to power off said disk drive;
   a second disk drive status inquiry sent by said host adapter to said processor to determine whether said disk drive has been powered off;
   a power on command sent by said host adapter to said processor to power on said disk drive; and
   a third disk drive status inquiry sent by said host adapter to said processor to determine whether said disk drive has been powered on.

11. A method in accordance with claim 6 wherein said host adapter is a RAID controller and said processor is a SEP device.

12. A method in accordance with claim 1 further including said disk drive being identified by virtue of requesting said disk drive to perform said requested operation multiple times without success.

13. A method in accordance with claim 1 further including determining whether said disk drive is a candidate for said power cycling sequence by considering whether said error condition is due to circumstances that cannot be corrected by power cycling.

14. A method in accordance with claim 1 wherein said determining includes determining whether a processor controlling power supplied to said disk drive supports said power cycling sequence.

15. A method in accordance with claim 1 further including determining whether a cumulative power cycle threshold for said disk drive has been reached representing said disk drive having undergone repeated power cycling over plural power cycling sessions.

16. A method in accordance with claim 1 further including determining whether a power cycle retry threshold for said disk drive has been reached representing said disk drive having undergone repeated power cycling in a current power cycling session.

17. A method in accordance with claim 16 further including resetting a power cycle retry count if said retry of said requested operation is successful.

18. A method in accordance with claim 16 further including retrying said power cycling sequence as necessary until said power retry threshold has been reached.

19. A method in accordance with claim 1 wherein said method is performed prior to said disk drive being designated offline.

20. A method in accordance with claim 1 wherein said method is performed using a SAF-TE INQUIRY command, a SAF-TE READ BUFFER command configured to implement a SEP Read Device Slot Status command, and SAF-TE WRITE BUFFER command configured to implement a modified SEP Perform Slot Operation command containing a disk drive power on Flag, a disk drive power off Flag, and an Identify Flag for providing an indication that said disk drive is in a power off state.

21. A disk array storage system having an array of disk drives adapted to store data, said system comprising:
   means for identifying a faulty disk drive in said array that exhibits an error condition in which said drive fails to perform a requested operation;
   means for determining whether automated selective disk drive power cycling is supported;
   means responsive to said determining producing a negative result for marking said faulty disk drive offline;
   means responsive to said determining producing a positive result for selectively power cycling said disk drive while maintaining power to other disk drives in said array; and
   means for retrying said requested operation following said power cycling sequence.

22. A storage system in accordance with claim 21 wherein said power cycling means includes means for removing and then restoring power at a power input to said disk drive.

23. A storage system in accordance with claim 21 wherein said power cycling means includes means for removing and then restoring power to one of at least two power inputs to said disk drive.

24. A storage system in accordance with claim 21 wherein said power cycling means is implemented in part by a disk drive host adapter.

25. A storage system in accordance with claim 21 wherein said power cycling means is implemented in part by a processor that controls power supplied to said disk drive.

26. A storage system in accordance with claim 21 wherein said power cycling means is implemented by a disk drive host adapter and a processor that controls power supplied to said disk drive.

27. A storage system in accordance with claim 26 wherein said determining means includes means in said host adapter for querying said processor to determine whether said processor supports said power cycling sequence.

28. A storage system in accordance with claim 26 wherein said power cycling means includes means in said host adapter for querying said processor to determine the presence of said disk drive prior to issuing a power cycling command to said processor.

29. A storage system in accordance with claim 26 wherein said power cycling means includes means in said host adapter for issuing a disk drive power off command to said processor followed by a disk drive power on command.

30. A storage system in accordance with claim 26 wherein said determining means and said power cycling means collectively include:
    means for sending a feature support inquiry from said host adapter to said processor to determine whether said processor supports said power cycling sequence;
    means for sending a first disk drive status inquiry from said host adapter to said processor to determine the status of said disk drive;
    means for sending a power off command sent from said host adapter to said processor to power off said disk drive;
    means for sending a second disk drive status inquiry from said host adapter to said processor to determine whether said disk drive has been powered off;
    means for sending a power on command from said host adapter to said processor to power on said disk drive; and
    means for sending a third disk drive status inquiry from said host adapter to said processor to determine whether said disk drive has been powered on.

31. A storage system in accordance with claim 26 wherein said host adapter is a RAID controller and said processor is a SEP device.

32. A storage system in accordance with claim 21 wherein said identifying means identifies said disk drive by virtue of requesting said disk drive to perform said requested operation multiple times without success.

33. A storage system in accordance with claim 21 further including means for determining whether said disk drive is a candidate for said power cycling sequence by considering whether said error condition is due to circumstances that cannot be corrected by power cycling.

34. A storage system in accordance with claim 21 wherein said determining means includes means for determining whether a processor controlling power supplied to said disk drive supports said power cycling sequence.

35. A storage system in accordance with claim 21 further including means for determining whether a cumulative power cycle threshold for said disk drive has been reached representing said disk drive having undergone repeated power cycling over plural power cycling session.

36. A storage system in accordance with claim 21 further including means for determining whether a power cycle retry threshold for said disk drive has been reached representing said disk drive having undergone repeated power cycling in a current power cycling session.

37. A storage system in accordance with claim 36 further including means for resetting a power cycle retry count if said retry of said requested operation is successful.

38. A storage system in accordance with claim 16 further including means for retrying said power cycling sequence as necessary until said power retry threshold has been reached.

39. A storage system in accordance with claim 21 wherein said power cycling of said disk drive is performed prior to said disk drive being designated offline.

40. A storage system in accordance with claim 21 wherein said power cycling means utilizes a SAF-TE INQUIRY command, a SAF-TE READ BUFFER command configured to implement a SEP Read Device Slot Status command, and SAF-TE WRITE BUFFER command implement a modified SEP Perform Slot Operation command containing a disk drive power on Flag, a disk drive power off Flag, and an Identify Flag for providing an indication that said disk drive is in a power off state.

41. A computer program product for performing error recovery in a disk array storage system having an array of disk drives adapted to store data, comprising:
    one or more data storage media for holding program instructions;
    program instruction means stored on said media for identifying a faulty disk drive in said array that exhibits an error condition in which said drive fails to perform a requested operation;
    program instruction means recorded on said media for determining whether automated selective disk drive power cycling is supported;
    program instruction means recorded on said media responsive to said determining producing a negative result for marking said faulty disk drive offline;
    program instruction means stored on said media responsive to said determining producing a positive result for selectively power cycling said disk drive while maintaining power to other disk drives in said array; and
    program instruction means stored on said media for retrying said requested operation following said power cycling sequence.

42. A host adapter adapted for communication with a host computer and managing at least one intelligent enclosure containing an enclosure processor and an array of disk drives, the processor being configured to independently control power supplied to said disk drives, said host adapter being configured to perform an error recovery procedure comprising the steps of:
    attempting one or more times without success to have a disk drive in the intelligent enclosure perform a requested operation;
    determining whether said disk drive is a candidate for automated selective disk drive power cycling;
    querying said enclosure processor to determine whether said enclosure processor supports automated selective disk drive power cycling;
    upon said determining producing a negative result, marking said faulty disk drive offline;

upon said determining producing a positive result, determining whether a cumulative power cycling threshold for said disk drive has been reached;

determining whether a power cycling threshold for said disk drive has been reached;

issuing a first read command to said enclosure processor to verify that said disk drive is in a power on state;

issuing a first write command to said enclosure processor to cycle said disk drive to a power off state while maintaining other disk drives in said enclosure in a power on state;

issuing a second read command to said enclosure processor to verify that said disk drive is in a power off state;

issuing a second write command to said enclosure processor to cycle said disk drive to a power on state;

issuing a third read command to said enclosure processor to verify that said disk drive is in a power on state; and re-attempting to have said disk drive perform said requested operation.

43. An intelligent enclosure adapted for communication with a host adapter and containing an enclosure processor controlling power to an array of disk drives, said intelligent enclosure being configured to perform an error recovery procedure comprising the steps of:

attempting one or more times without success to have a disk drive in the intelligent enclosure perform a requested operation;

responding to a query from said host adapter seeking to determine whether said enclosure processor supports automated selective disk drive power cycling;

upon said response being negative, advising said host adaptor of said status so that said disk drive can be marked offline by said host adaptor;

upon said response being positive, responding to a first read command from said host adapter seeking to verify that said disk drive is in a power on state;

responding to a first write command from said host adapter seeking to cycle said disk drive to a power off state while maintaining other disk drives in said enclosure in a power on state;

responding to a second read command from said host adapter seeking to verify that said disk drive is in a power off state;

responding to a second write command from said adapter seeking to cycle said disk drive to a power on state; and responding to a third read command from said adapter seeking to verify that said disk drive is in a power on state.

* * * * *

UNITED STATES PATENT AND TRADEMARK OFFICE
CERTIFICATE OF CORRECTION

PATENT NO. : 6,959,399 B2 Page 1 of 1
APPLICATION NO. : 09/961950
DATED : October 25, 2005
INVENTOR(S) : Allen King et al.

It is certified that error appears in the above-identified patent and that said Letters Patent is hereby corrected as shown below:

Col. 18 line 47, change "and SAF-TE" to --and a SAF-TE--;

Col. 20 line 14, change "16" to --36--; and

Col. 20 line 24, change "SAF-TE WRITE BUFFER command implement" to --a SAF-TE WRITE BUFFER command configured to implement--.

Signed and Sealed this

Fifth Day of February, 2008

JON W. DUDAS
*Director of the United States Patent and Trademark Office*